United States Patent
Tsugoshi et al.

(10) Patent No.: US 12,227,156 B2
(45) Date of Patent: Feb. 18, 2025

(54) VEHICLE BRAKE CONTROL DEVICE AND VEHICLE BRAKE CONTROL METHOD

(71) Applicant: Mitsubishi Electric Corporation, Tokyo (JP)

(72) Inventors: Ryohei Tsugoshi, Tokyo (JP); Shumpei Onodera, Tokyo (JP); Takuya Okahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1092 days.

(21) Appl. No.: 17/255,482

(22) PCT Filed: Jul. 25, 2018

(86) PCT No.: PCT/JP2018/027981
§ 371 (c)(1),
(2) Date: Dec. 23, 2020

(87) PCT Pub. No.: WO2020/021665
PCT Pub. Date: Jan. 30, 2020

(65) Prior Publication Data
US 2021/0146895 A1 May 20, 2021

(51) Int. Cl.
*B60T 8/172* (2006.01)
*B60T 8/17* (2006.01)
(Continued)

(52) U.S. Cl.
CPC .......... *B60T 8/172* (2013.01); *B60T 8/1705* (2013.01); *B60T 8/171* (2013.01); *B60T 8/3235* (2013.01);
(Continued)

(58) Field of Classification Search
None
See application file for complete search history.

(56) References Cited

U.S. PATENT DOCUMENTS

| | | | | |
|---|---|---|---|---|
| 6,089,677 A | * | 7/2000 | Fukumura | B60T 8/326 303/167 |
| 2007/0216222 A1 | * | 9/2007 | Miyazaki | B60T 8/172 303/177 |

(Continued)

FOREIGN PATENT DOCUMENTS

| | | |
|---|---|---|
| JP | S55131154 A | 10/1980 |
| JP | H0347945 A | 2/1991 |

(Continued)

OTHER PUBLICATIONS

Office Action mailed on May 28, 2021, for corresponding Indian Patent Application No. 202127002281, 5 pages.
(Continued)

*Primary Examiner* — Justin S Lee
(74) *Attorney, Agent, or Firm* — BUCHANAN, INGERSOLL & ROONEY PC (57) ABSTRACT

A brake controller includes: a necessary braking force calculator to calculate a necessary braking force that is a braking force generated by a mechanical brake apparatus in order to obtain a deceleration indicated by a brake command; an initial speed acquirer to acquires an initial speed; a target pressing force calculator to calculate a target pressing force that is a force for pressing a brake shoe against a wheel in order to obtain the necessary braking force; and a target pressure calculator to calculate a target pressure indicating a pressure of a fluid inside the brake cylinder that is necessary for obtaining the target pressing force and perform feedback control to adjust the target pressure based on a feedback signal acquired from a pressure sensor.

9 Claims, 7 Drawing Sheets

(51) Int. Cl.
*B60T 8/171* (2006.01)
*B60T 8/32* (2006.01)
*B60T 13/66* (2006.01)
*B60T 17/22* (2006.01)
*B61H 13/20* (2006.01)

(52) U.S. Cl.
CPC .......... *B60T 13/662* (2013.01); *B60T 17/221* (2013.01); *B61H 13/20* (2013.01); *B60T 2250/04* (2013.01); *B60T 2270/88* (2013.01)

(56) References Cited

U.S. PATENT DOCUMENTS

| | | | | |
|---|---|---|---|---|
| 2010/0217491 | A1* | 8/2010 | Naito | B60G 7/006 |
| | | | | 701/49 |
| 2011/0029213 | A1* | 2/2011 | Itano | B60T 13/665 |
| | | | | 701/70 |
| 2012/0101713 | A1* | 4/2012 | Moshchuk | B60W 40/064 |
| | | | | 701/301 |
| 2013/0030651 | A1* | 1/2013 | Moshchuk | B60W 30/09 |
| | | | | 701/41 |
| 2015/0197226 | A1* | 7/2015 | Svensson | B60T 8/171 |
| | | | | 701/70 |
| 2016/0001752 | A1* | 1/2016 | Yasui | B60T 8/172 |
| | | | | 701/70 |
| 2018/0134264 | A1* | 5/2018 | Masuda | F16D 65/18 |
| 2018/0265081 | A1* | 9/2018 | Yoneda | B60W 30/0956 |
| 2020/0031330 | A1* | 1/2020 | Tione | B60T 17/228 |

FOREIGN PATENT DOCUMENTS

| | | |
|---|---|---|
| JP | H115533 A | 1/1999 |
| JP | 2003291797 A | 10/2003 |
| JP | 2014046898 A | 3/2014 |
| JP | 2016159795 A | 9/2016 |
| JP | 2017206174 A * | 11/2017 |

OTHER PUBLICATIONS

International Search Report (PCT/ISA/210), with translation, and Written Opinion (PCT/ISA/237) mailed on Oct. 23, 2018, by the Japan Patent Office as the International Searching Authority for International Application No. PCT/JP2018/027981.

Office Action mailed on Oct. 27, 2020, by the Japan Patent Office for Application No. 2020-531902.

* cited by examiner

| PRESSING FORCE / VEHICLE SPEED | $N_1$ | $N_2$ | ... | $N_m$ |
|---|---|---|---|---|
| $V_1$ | $\mu_{11}$ | $\mu_{12}$ | ... | $\mu_{1m}$ |
| $V_2$ | $\mu_{21}$ | $\mu_{22}$ | ... | $\mu_{2m}$ |
| ⋮ | ⋮ | ⋮ | ⋮ | ⋮ |
| $V_k$ | $\mu_{k1}$ | $\mu_{k2}$ | ... | $\mu_{km}$ |

VEHICLE BRAKE CONTROL DEVICE AND VEHICLE BRAKE CONTROL METHOD

TECHNICAL FIELD

The present disclosure relates to a vehicle brake control device and a vehicle brake control method.

BACKGROUND ART

A brake control device mounted on a rail vehicle, in order to obtain a target deceleration indicated by a brake command, compresses fluid supplied from a fluid source to supply the compressed fluid to a brake cylinder included in a mechanical brake apparatus. An example of this type of a brake control device is disclosed in Patent Literature 1. The rail vehicle brake control device disclosed in Patent Literature 1 calculates a necessary braking force from a brake command, compresses a fluid supplied from a fluid source up to a pressure for obtaining the necessary braking force, and supplies the compressed fluid to a brake cylinder included in a mechanical brake apparatus. The compressed fluid is supplied to the brake cylinder, thereby pressing a brake shoe against a wheel, so that a braking force is obtained.

CITATION LIST

Patent Literature

Patent Literature 1: Unexamined Japanese Patent Application Publication No. 2003-291797

SUMMARY OF INVENTION

Technical Problem

As described above, the brake force is obtained by pressing the brake shoe against the wheel. The braking force is expressed as the product of (i) a friction coefficient of a contact surface between the brake shoe and the wheel and (ii) a pressing force that is a force of pressing the brake shoe against the wheel. The braking force obtained from the same brake command sometimes varies due to a change in the friction coefficient that depends on, for example, a speed of a vehicle at the start of braking, the magnitude of pressing force, and the like. As a result, variation sometimes occurs in the stop position of the vehicle so that the stop position differs from a target position.

In consideration of such circumstances, an object of the present disclosure is to provide a vehicle brake control device and a vehicle brake control method for suppressing the variance in the braking force obtained from the same brake command.

Solution to Problem

In order to attain the aforementioned objective, a vehicle brake control device according to the present disclosure is a vehicle brake control device that controls a mechanical brake apparatus that (i) includes a brake cylinder and a friction member to operate in accordance with a pressure of a fluid inside the brake cylinder and (ii) causes generation of a braking force by pressing the friction member against a rotatable body that rotates when a vehicle travels. The vehicle brake control device includes a necessary braking force calculator, an initial speed acquirer, a target pressing force calculator, a target pressure calculator, and an outputter. The necessary braking force calculator acquires a brake command indicating a target deceleration of the vehicle and calculates a necessary braking force that is a braking force necessary for obtaining the target deceleration. The initial speed acquirer acquires a speed of the vehicle in response to acquisition of the brake command by the necessary braking force calculator. Using, as a friction coefficient of a contact surface between the friction member and the rotatable body, an average friction coefficient that varies depending on (i) an initial speed that is the speed of the vehicle acquired by the initial speed acquirer and (ii) a pressing force that is a force for pressing the friction member against the rotatable body, the target pressing force calculator calculates, from the average friction coefficient and the necessary braking force, a target pressing force that is a force for pressing the friction member against the rotatable body in order to obtain the necessary braking force. The target pressure calculator calculates a target pressure indicating a pressure of the fluid inside the brake cylinder that is necessary for obtaining the target pressing force. The outputter compresses, in accordance with the target pressure, fluid supplied from a fluid source to supply the compressed fluid to the mechanical brake apparatus.

Advantageous Effects of Invention

According to the present disclosure, from (i) the average friction coefficient varying depending on the initial speed and the pressing force that is the force for pressing the friction member against the rotatable body, and (ii) the necessary braking force, the target pressing force is calculated that is the force for pressing the friction member against rotatable body in order to obtain the necessary braking force. Additionally, the fluid is compressed in accordance with the target pressure indicating the pressure of the fluid inside the brake cylinder that is necessary for obtaining the target pressing force, and then the compressed fluid is supplied to the mechanical brake apparatus. As a result, a vehicle brake control device and a vehicle brake control method can be provided that suppress the variance in the braking force obtained from the same brake command.

DESCRIPTION OF EMBODIMENTS

A vehicle brake control device and a vehicle brake control method according to an embodiment of the present disclosure are described below in detail with reference to drawings. Components that are the same or equivalent are assigned the same reference signs throughout the drawings.

Figure 1:
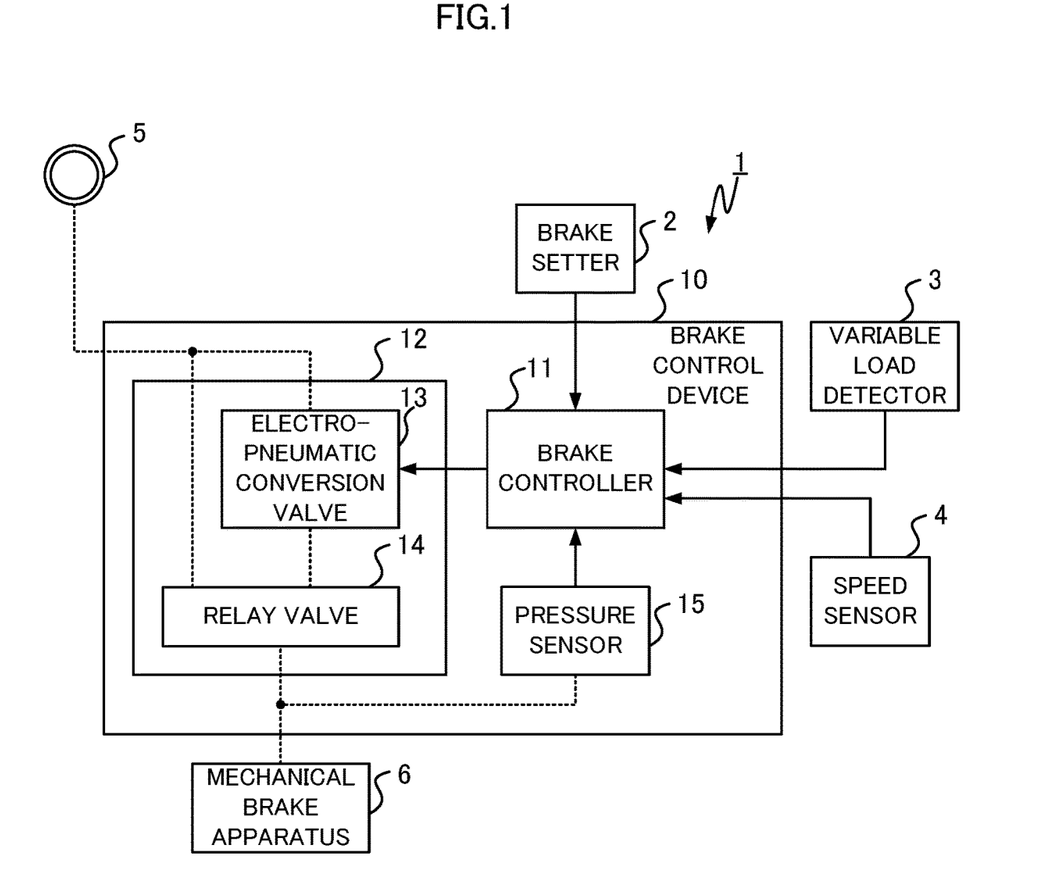
FIG. 1 is a block diagram illustrating a configuration of a vehicle brake system according to an embodiment of the present disclosure.

FIG. 1 illustrates a vehicle brake system 1 mounted on a rail vehicle as an example of a vehicle. The vehicle brake system 1 includes a brake setter 2 that outputs a brake command in accordance with an operation of a driver, a variable load detector 3 that detects a weight of the vehicle, a speed sensor 4 that detects a speed of the vehicle, a fluid source 5, a mechanical brake apparatus 6 that generates a braking force for the vehicle, and a brake control device 10 that compresses, in accordance with a brake command, a fluid supplied from the fluid source 5 and supplies the compressed fluid to the mechanical brake apparatus 6. In FIG. 1, an electric signal is indicated by a solid line, and a flow of the fluid is indicated by a dotted line.

The brake setter 2 includes a master controller provided in a cab and sends, to the brake control device 10, a brake command corresponding to an operation of the master controller by the driver. The brake command includes a brake notch indicating a target deceleration of the vehicle. The variable load detector 3 is mounted on the vehicle, detects the weight of the vehicle including the weights of passengers in the vehicle, the weights of devices mounted on the vehicle, and the weight of luggage, and sends the detected value to the brake control device 10. The speed sensor 4 includes a pulse generator (PG) attached to an axle and sends, to the brake control device 10, a signal indicating a rotational frequency of the axle obtained from a pulse signal output by the PG. The fluid source 5 supplies, to the brake control device 10, air as an example of the fluid.

The brake control device 10 (i) compresses, based on the brake command output by the brake setter 2, the detection value of the variable load detector 3, and the detection value of the speed sensor 4, the fluid supplied from the fluid source 5 and (ii) supplies the compressed fluid to the mechanical brake apparatus 6. The mechanical brake apparatus 6 includes a brake cylinder and a friction member that operates in accordance with a pressure of the fluid inside the brake cylinder. When the pressure in the brake cylinder is increased by supplying, to the brake cylinder, the air that is supplied from the fluid source 5 and compressed by the brake control device 10, the friction member is pressed against a rotatable body that rotates during traveling of the vehicle, thereby generating a braking force. The mechanical brake apparatus 6 includes a brake shoe as an example of the friction member. The brake shoe is pressed against a wheel that is an example of the rotatable body, thereby generating the braking force. The braking force is expressed as a product of (i) a pressing force that is a force for pressing the brake shoe against the wheel and (ii) a friction coefficient of a contact surface between the brake shoe and the wheel.

Although the details are described later, the brake control device 10 calculates a pressing force for obtaining the target deceleration indicated by the brake command using, as the friction coefficient of the contact surface between the friction member and the rotatable body, an average friction coefficient that changes depending on (i) an initial speed that is a speed of the vehicle acquired in response to the acquisition of the brake command and (ii) the pressing force. Additionally, the brake control device 10 (i) compresses the air supplied from the fluid source 5 in accordance with the pressure of the fluid inside the brake cylinder that is necessary for obtaining the calculated pressing force, and (ii) supplies the compressed air to the mechanical brake apparatus 6. The brake control device 10 supplies, to the mechanical brake apparatus 6, the air compressed based on the pressing force calculated as described above, thereby enabling suppression of the variation in the brake force obtained from the same brake command.

The brake control device 10 includes (i) a brake controller 11 that calculates a target pressure indicating the pressure of the brake cylinder necessary for obtaining the target deceleration indicated by the brake command, (ii) an outputter 12 that compresses the air supplied from the fluid source 5 in accordance with the target pressure to output the compressed air to the mechanical brake apparatus 6, and (iii) a pressure sensor 15 that detects the pressure of the air output by the outputter 12 to send a feedback signal to the brake controller 11.

Figure 2:
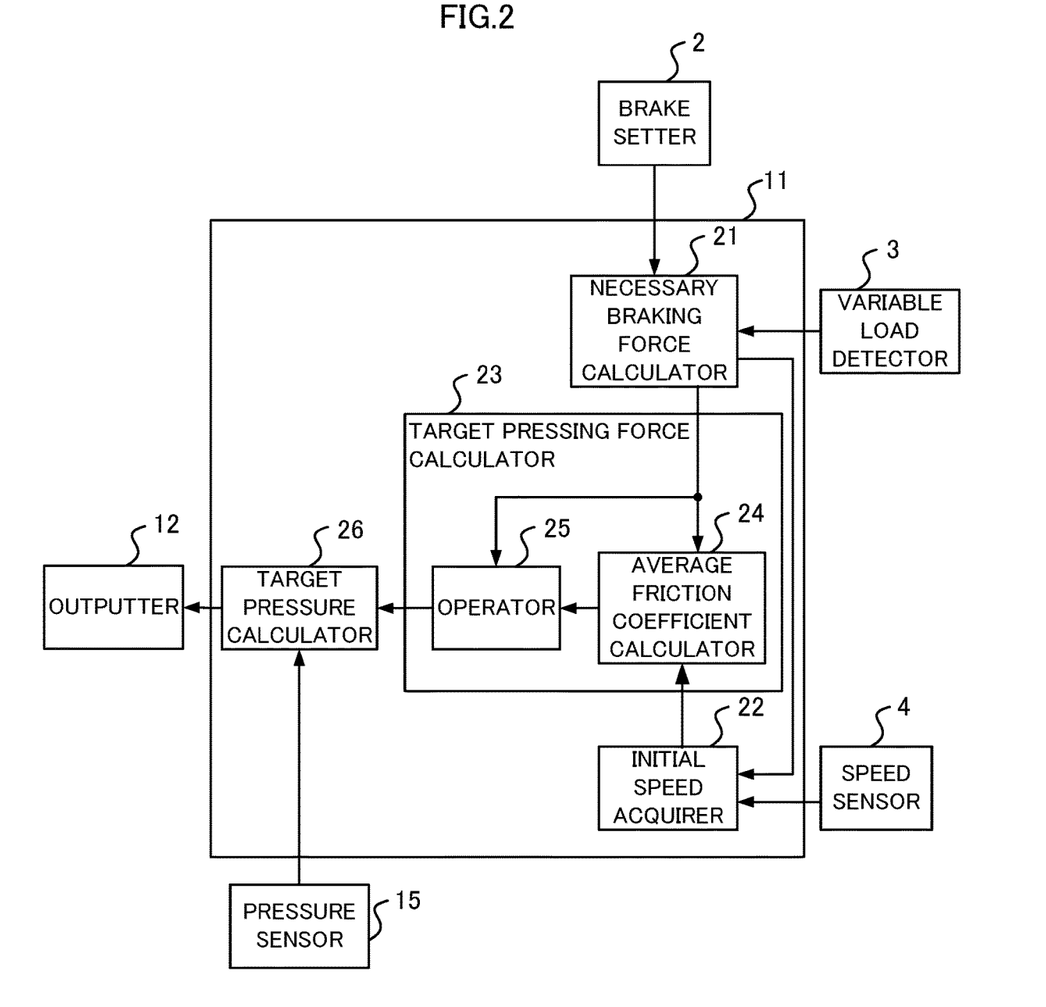
FIG. 2 is a block diagram illustrating a configuration of a vehicle brake control device according to the embodiment.

As illustrated in FIG. 2, the brake controller 11 includes (i) a necessary braking force calculator 21 that calculates a necessary braking force that is a braking force generated by the mechanical brake apparatus 6 in order to obtain the deceleration indicated by the brake command, (ii) an initial speed acquirer 22 that acquires the initial speed, (iii) a target pressing force calculator 23 that calculates a target pressing force that is a force for pressing the brake shoe against the wheel to obtain the necessary braking force, and (iv) a target pressure calculator 26 that calculates a target pressure indicating the pressure of the fluid inside the brake cylinder that is necessary for obtaining the target pressing force and performs feedback control to adjust the target pressure based on a feedback signal acquired from the pressure sensor 15. The target pressing force calculator 23 includes (i) an average friction coefficient calculator 24 that calculates an average friction coefficient of the contact surface between the brake shoe and the wheel for each pressing force at the initial speed, and (ii) an operator 25 that calculates the target pressing force from the average friction coefficient calculated by the average friction coefficient calculator 24 and the necessary braking force. The brake controller 11 having the above-described configuration (i) calculates the target pressure from the brake command acquired from the brake setter 2, the detection value of the variable load detector 3, and the signal indicating the rotational frequency of the axle acquired from the speed sensor 4, and (ii) sends, to the outputter 12, an electrical command indicating the target pressure.

As illustrated in FIG. 1, the outputter 12 includes (i) an electro-pneumatic conversion valve 13 that converts the electrical command sent from the brake controller 11 into a pneumatic command and (ii) a relay valve 14 that compresses, in accordance with an output of the electro-pneumatic conversion valve 13, the air supplied from the fluid source 5 and outputs the compressed air to the mechanical brake apparatus 6. The electro-pneumatic conversion valve 13 adjusts, in accordance with the electrical command sent from the brake controller 11, the pressure of the air supplied from the fluid source 5 and outputs the pressure-adjusted air to the relay valve 14. The relay valve 14 (i) compresses, in accordance with the pressure of the air output by the electro-pneumatic conversion valve 13, the air supplied from the fluid source 5 and (ii) supplies the compressed air to the mechanical brake apparatus 6.

Figure 3:
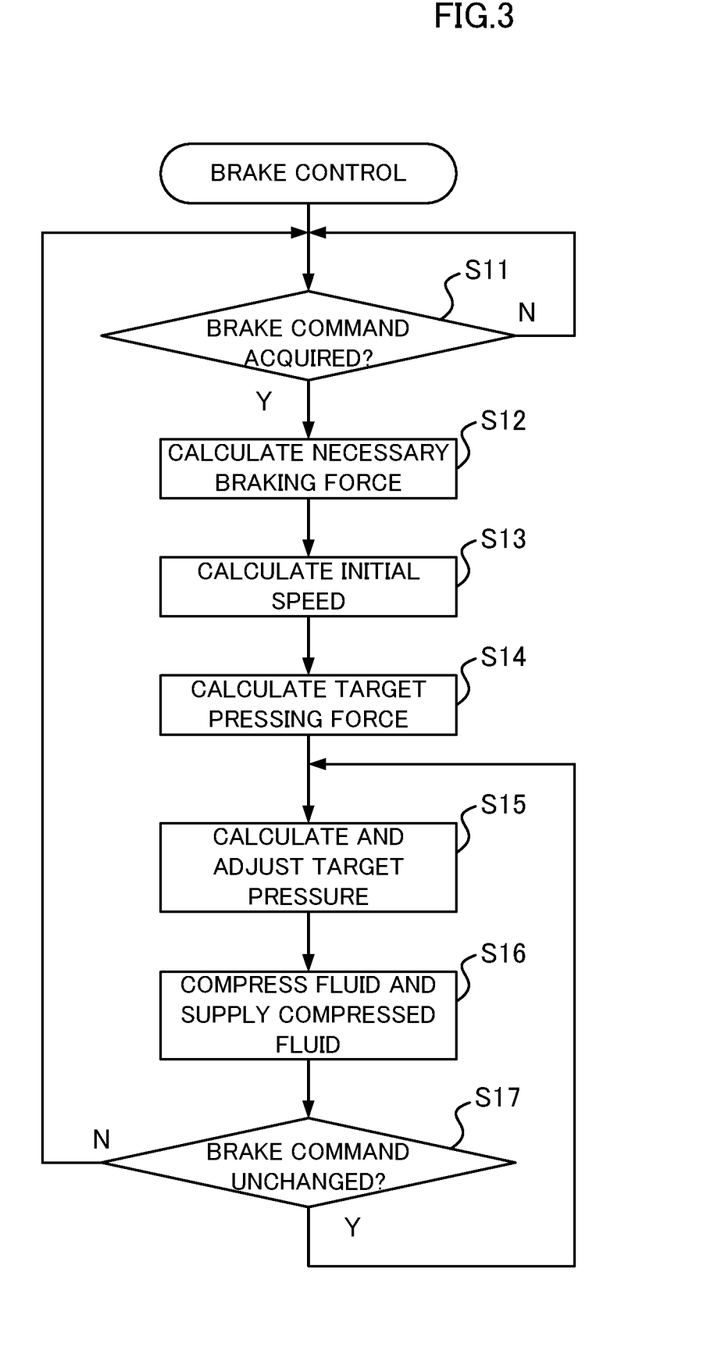
FIG. 3 is a flow chart illustrating one example of operation of brake control performed by the vehicle brake control device according to the embodiment.

A summary of the operation of the brake control device 10 having the above-described configuration is described with reference to FIG. 3. During a period in which the brake command is not acquired (No in step S11), the necessary braking force calculator 21 repeats a process of step S11.

Upon acquiring the brake command (Yes in step S11), the necessary braking force calculator 21 calculates the necessary braking force from (i) the target deceleration indicated by the brake command and (ii) the detection value of the variable load detector 3 (step S12). The initial speed acquirer 22 (i) acquires, in response to the acquisition of the brake command by the necessary braking force calculator 21, a pulse signal from the speed sensor 4 and (ii) calculates the initial speed from the pulse signal (step S13). Using the average friction coefficient that changes depending on the initial speed and the pressing force, the target pressing force calculator 23 calculates, from the average friction coefficient and the necessary braking force, the target pressing force that is the force for pressing the brake shoe against the wheel in order to obtain the necessary braking force (step S14). The target pressure calculator 26 (i) calculates the target pressure indicating the pressure of the fluid inside the brake cylinder that is necessary for obtaining the pressing force calculated by the target pressing force calculator 23 and (ii) adjusts the target pressure in accordance with the feedback signal acquired from the pressure sensor 15 (step S15). The outputter 12 (i) compresses the air until the pressure of the air supplied from the fluid source 5 reaches the target pressure and (ii) supplies the compressed air to the mechanical brake apparatus 6 (step S16). When there is no change in the brake notch indicated by the brake command (Yes in step S17), the processing returns to step S15 and the above-described processes are repeated. Specifically, the following processes are repeated: the target pressure is calculated using the target pressing force calculated in step S14; the target pressure is adjusted in accordance with the feedback signal acquired from the pressure sensor 15; the air supplied from the fluid source 5 is compressed until the pressure of the air reaches the target pressure; and the compressed air to the mechanical brake apparatus 6 is supplied. A variable used for calculating the target pressure may be different from a variable used for previously calculating the target pressure. In a case in which the same brake command is not continuously acquired, that is, in a case in which the brake notch indicated by the brake command is changed (No in step S17), the processing returns to step S11 and the above-described processes are repeated.

The operation of each component of the brake control device 10 that performs the above-described processing is described in detail. Upon acquiring the brake command from the brake setter 2, the necessary braking force calculator 21 calculates the necessary braking force F1 from the below-described equation (1) based on a target deceleration α indicated by the brake command and a weight W1 of the vehicle detected by the variable load detector 3. The necessary braking force calculator 21 sends the necessary braking force F1 to the average friction coefficient calculator 24. The below-described equation (1) represents the necessary braking force for each mechanical brake apparatus 6 in a case in which the vehicle is supported by two bogies, each of the bogies includes four wheels, and each of the wheels is provided with the mechanical brake apparatus 6. Additionally, the necessary braking force calculator 21 sends the target deceleration α to the initial speed acquirer 22.

$$F1 = \alpha \cdot W1/8 \quad (1)$$

The initial speed acquirer 22 acquires the speed of the vehicle in response to the acquisition of the brake command by the necessary braking force calculator 21. Specifically, the initial speed acquirer 22 detects a change in the target deceleration α acquired from the necessary braking force calculator 21, that is, a change in the brake command. Upon detecting the change in the brake command, the initial speed acquirer 22 calculates the speed of the vehicle from the pulse signal acquired from the speed sensor 4. The initial speed acquirer 22 sends the calculated speed of the vehicle to the average friction coefficient calculator 24. In the following description, the speed of the vehicle calculated by the initial speed acquirer 22 is referred to as the initial speed $V_{int}$. The change in the brake command includes (i) a case in which the brake command is input from a state in which the brake command is not input and (ii) a case in which the number of notches of the brake notch included in the brake command changes, that is, a case in which the target deceleration α changes.

Figure 4:
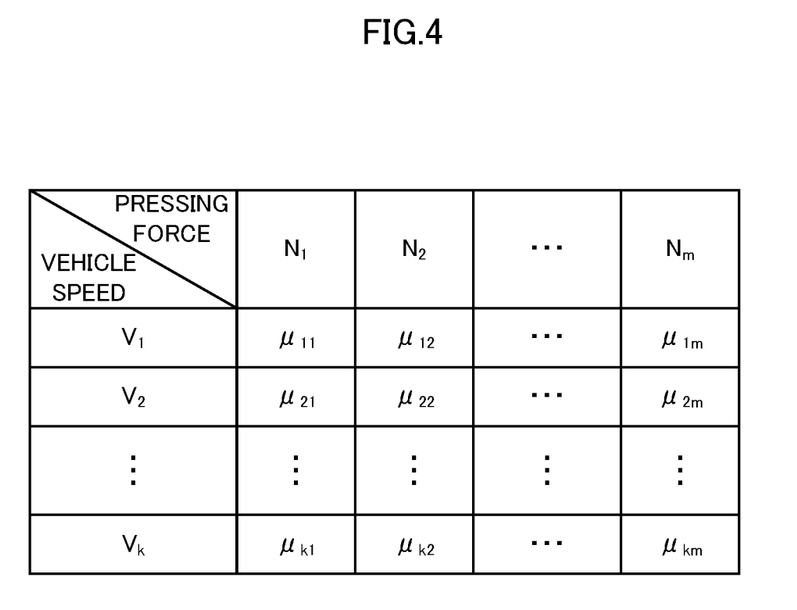
FIG. 4 is a view illustrating an example of an average friction coefficient table of the embodiment for identifying an average friction coefficient from a speed of a vehicle and a pressing force.

The average friction coefficient calculator 24 (i) calculates, from the average friction coefficient of the contact surface between the friction member and the rotatable body, an average friction coefficient for each pressing force at an initial speed, the average friction coefficient of the contact surface between the friction member and the rotatable body being predetermined for each pressing force at each of mutually-different predetermined vehicle speeds, and (ii) sends the calculated average friction coefficient to the operator 25. Specifically, the average friction coefficient calculator 24 stores an average friction coefficient table for identifying the average friction coefficient from the speed of the vehicle and the pressing force. The average friction coefficient table illustrated in FIG. 4 is a table for identifying the average friction coefficient by combining vehicle speeds $V_1$, $V_2$, ..., and $V_k$ and pressing forces $N_1$, $N_2$, ..., and $N_m$. For example, the average friction coefficient μ for the vehicle speed $V_1$ and the pressing force $N_1$ is $\mu_{11}$. In the following description, the following relationships are assumed to be satisfied: $V_1 < V_2 < \ldots < V_k$, and $N_1 < N_2 < \ldots < N_m$. The values listed in the average friction coefficient table are determined based on results of a test run during in which the vehicle travels with a brake applied with a constant pressing force, a simulation, or the like. In a case in which the speed is constant, the friction coefficient decreases as the pressing force increases. Also, in a case in which the pressing force is the constant, the friction coefficient decreases as the speed increases.

Figure 5:
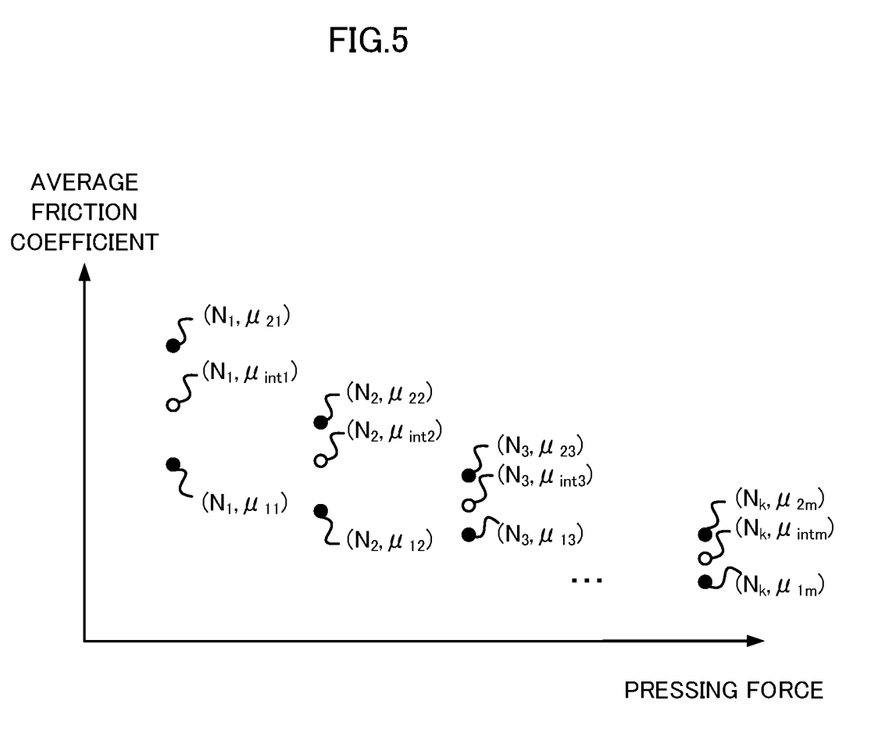
FIG. 5 is a view illustrating an example of a method of the embodiment for calculating the average friction coefficient for each pressing force at an initial speed.

The average friction coefficient calculator 24 storing the above-described average friction coefficient table calculates, from a value listed in the average friction coefficient table or a value obtained by performing interpolation between values in the average friction coefficient table, the average friction coefficient for each pressing force at the initial speed. For example, when the initial speed $V_{int}$ matches one of the vehicle speeds $V_1$, $V_2$, ..., and $V_k$ defined in the average friction coefficient table, the average friction coefficient for each pressing force that is associated with the matched vehicle speed is used as the average friction coefficient for each pressing force at the initial speed $V_{int}$. For example, when $V_{int} = V_2$, the average friction coefficients $\mu_{21}$, $\mu_{22}$, ..., and $\mu_{2m}$ respectively corresponding to the pressing forces $N_1$, $N_2$, ..., and $N_m$ are used as the average friction coefficient for each pressing force at the initial speed $V_{int}$. Also, for example, when the initial speed $V_{int}$ satisfies the condition $V_1 < V_{int} < V_2$, interpolation is performed using (i) the average friction coefficients $\mu_{11}$, $\mu_{12}$, ..., and $\mu_{1m}$ corresponding to the vehicle speed $V_1$ and (ii) the average friction coefficients $\mu_{21}$, $\mu_{22}$, ..., and $\mu_{2m}$ corresponding to the vehicle speed $V_2$, thereby calculating the average friction coefficient for each pressing force at the initial speed $V_{int}$. The average friction coefficient calculator 24 performs linear interpolation as an example of interpolation and calculates the average friction coefficient for each pressing force at the initial speed $V_{int}$. The friction coefficient corresponding to initial speed $V_{int}$ and pressing force $N_1$ in the case of performing the linear interpolation is expressed by the below-described equation (2). The average friction coefficients corresponding to pressing force $N_2, \ldots,$ and $N_m$ at initial speed $V_{int}$ are also calculated in a similar manner, and, as illustrated by a white circle in FIG. 5, the average friction coefficients $\mu_{int\ 1}, \mu_{int\ 2}, \ldots, \mu_{int\ m}$ for each pressing force at the initial speed $V_{int}$ are obtained.

[Equation 1]

$$\mu_{int\ 1} = \frac{V_2 - V_{int}}{V_2 - V_1} \cdot \mu_{11} + \frac{V_{int} - V_1}{V_2 - V_1} \cdot \mu_{21} \quad (2)$$

Figure 6:
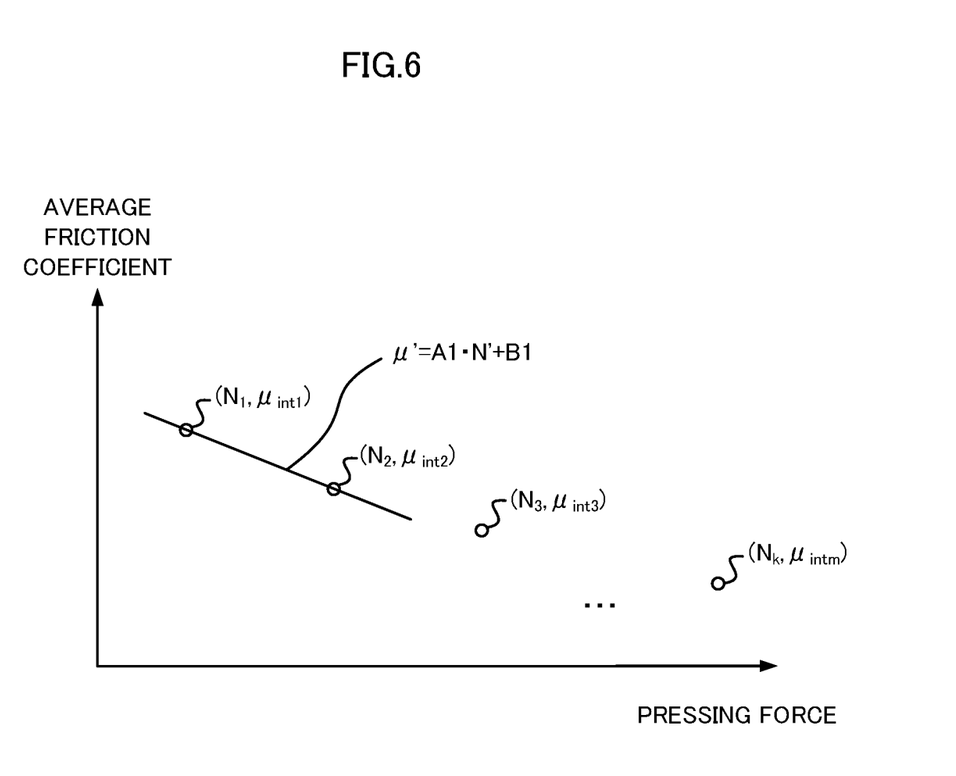
FIG. 6 is a view illustrating an example of a relational expression of the embodiment for identifying a pressing force using the average friction coefficient as a variable.

As described above, the operator 25 obtaining the average friction coefficient calculated by the average friction coefficient calculator 24 obtains, from the average friction coefficient for each pressing force at the initial speed $V_{int}$, a relational expression for calculating the pressing force at the initial speed using the average friction coefficient as a variable. Specifically, as illustrated by a straight line in FIG. 6, the operator 25 performs linear interpolation between two adjacent points among the average friction coefficients $\mu_{int\ 1}$, $\mu_{int\ 2}, \ldots, \mu_{int\ m}$ for each pressing force at the initial speed $V_{int}$, thereby obtaining the relational expression. The relational expression illustrated by a straight line in FIG. 6 is expressed by the below-described equation (3). The relational expression is a linear function for calculating a pressing force N' using an average friction coefficient μ' as a variable. In the below-described equation (3), symbols A1 and B1 denote coefficients, A1 is expressed by the below-described equation (4), and B1 is expressed by the below-described equation (5).

$$\mu' = A1 \cdot N' + B1 \quad (3)$$

$$A1 = (\mu_{int\ 2} - \mu_{int\ 1})/(N_2 - N_1) \quad (4)$$

$$B1 = (\mu_{int\ 1} \cdot N_2 - \mu_{int\ 2} \cdot N_1)/(N_2 - N_1) \quad (5)$$

Also, the operator 25 obtains an equation regarding the pressing force from the relational expressions obtained as described above. As expressed by the below-described equation (6), the necessary braking force F1 can be regarded as corresponding to the product of the average friction coefficient and the pressing force N'. The below-described equation (7) is obtained by substituting the below-described equation (6) into the above equation (1). The below-described equation (8), which is a quadratic equation regarding the pressing force N', is obtained from (i) the above-described equation (3) that represents the relational equation indicated by a straight line in FIG. 6 and (ii) the below-described equation (7). The operator 25 obtains solutions of the quadratic equation based on the quadratic formula, calculates a positive solution as the target pressing force $N_{tgt}$, and sends the target pressing force $N_{tgt}$ to the target pressure calculator 26. Since the target pressing force can be obtained using the quadratic formula, the calculation process is more simplified in comparison to a case in which a calculation process is repeated to obtain an optimal solution, an approximate solution, or the like. When the quadratic equation has no solution, the operator 25 (i) performs linear interpolation between two other adjacent points among average friction coefficients $\mu_{int\ 1}, \mu_{int\ 2}, \ldots,$ and $\mu_{int\ m}$ for each pressing force at the initial speed $V_{int}$, thereby obtaining the relational expression, and (ii) repeats the above-described processes.

$$F1 = \mu' \cdot N' \quad (6)$$

$$\alpha \cdot W1/8 = \mu' \cdot N' \quad (7)$$

$$\alpha \cdot W1/8 = A1 \cdot N'^2 + B1 \cdot N' \quad (8)$$

The target pressure calculator 26 calculates a target pressure $P_{tgt}$ from the pressing force $N_{tgt}$. Specifically, the target pressure calculator 26 divides the pressing force $N_{tgt}$ by the area of a surface perpendicular to a sliding direction of a piston included in the mechanical brake apparatus 6, thereby obtaining the target pressure $P_{tgt}$. The piston slides due to the pressure of the fluid inside the brake cylinder, thereby moving the brake shoe, and the brake shoe is pressed against the wheel, thereby generating a braking force. The target pressure calculator 26 adjusts, in accordance with a feedback signal acquired from the pressure sensor 15, the target pressure $P_{tgt}$ so that the pressure of air output by the relay valve 14 approaches the most recently calculated target pressure $P'_{tgt}$. Target pressure calculator 26 outputs, to the electro-pneumatic conversion valve 13, the electrical command indicating the target pressure $P_{tgt}$.

The electro-pneumatic conversion valve 13 (i) adjusts the pressure of the air supplied from the fluid source 5 in accordance with the target pressure $P_{tgt}$ indicated by the electrical command sent from the brake controller 11 and (ii) outputs the pressure-adjusted air to the relay valve 14. Using, as a command pressure, the pressure of the air output from the electro-pneumatic conversion valve 13, the relay valve 14 compresses the air supplied from the fluid source 5 in accordance with the command pressure, and the relay valve 14 supplies the compressed air to the mechanical brake apparatus 6. As described above, the air compressed by the brake control device 10 is supplied to the brake cylinder, thereby pressing the friction member against the rotatable body that rotates during traveling of the vehicle, and thus a braking force is generated.

As described above, the brake control device 10 according to the present embodiment calculates the target pressing force from (i) the average friction coefficient that changes depending on the initial speed and the pressing force and (ii) the necessary braking force. Also, the brake control device 10 (i) compresses the fluid up to a pressure necessary for obtaining the target pressing force and (ii) supplies the compressed fluid to the mechanical brake apparatus, so that a vehicle brake control device and a vehicle brake control method can be provided that suppress the variation in the braking force obtained from the same brake command.

In a conventional brake control device that uses a friction coefficient depending on an initial speed and a brake command, for the same initial speed and the same brake command, a target pressing force is calculated using the same friction coefficient despite a different in vehicle weight. As expressed by the above-described equation (1), the necessary braking force increases as the weight of the vehicle increases. As can be seen from the above-described equation (6), when the friction coefficient is constant, the target pressing force increases as the necessary braking force increases. In the conventional brake control device, the same friction coefficient is used even when the weight of the vehicle is different. However, as the pressing force increases, an actual friction coefficient becomes less than the friction coefficient used for calculating the target pressing force. As a result, the actually generated braking force is sometimes less than the necessary braking force. On the other hand, the brake control device 10 according to the present embodiment uses the average friction coefficient that varies depending on the initial speed and the pressing force to calculate the pressing force using different average friction coefficients in accordance with a difference in vehicle weight. Accordingly, excess and deficiency of braking force can be suppressed.

Figure 7:
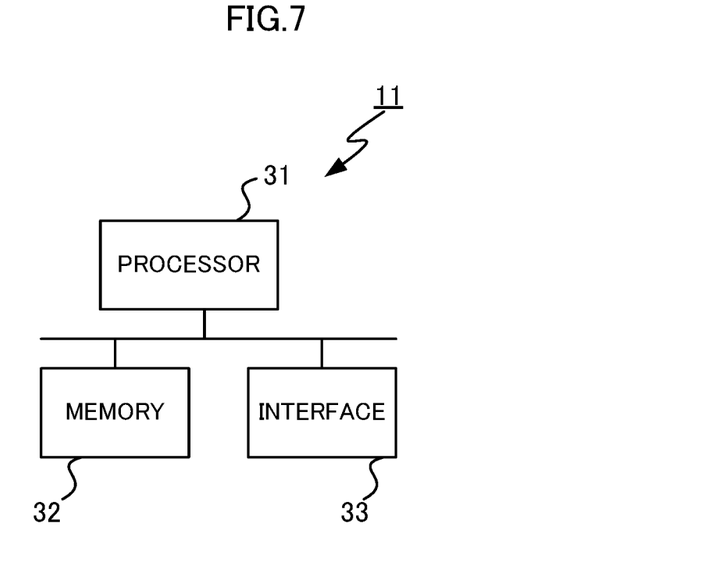
FIG. 7 is a diagram illustrating an example of a hardware configuration of the vehicle brake control device according to the embodiment.

FIG. 7 is a diagram illustrating an example of a hardware configuration of the brake controller 11 according to the embodiment. The brake controller 11 includes, as a hardware configuration that controls each component, a processor 31, a memory 32, and an interface 33. Each of the functions of these devices is achieved by the processor 31 executing a program stored in the memory 32. The interface 33 is used for connecting each device and establishing communication, and may include two or more types of interfaces as may be required. Although FIG. 7 illustrates an example in which the brake controller 11 includes a single processor 31 and a single memory 32, multiple processors 31 and multiple memories 32 may cooperate with one another to execute respective functions.

In addition, the above-described hardware configuration and flowchart are merely examples, and can be freely changed or modified.

The central portion that includes the processor 31, the memory 32, and the interface 33 to perform control processing can be achieved using a normal computer system without using a dedicated system. For example, the brake controller 11 may be configured to execute the above-described processes by (i) storing, on a computer readable recording medium (a flexible disc, a compact disc-read only memory (CD-ROM), digital versatile disc-read only memory (DVD-ROM) or the like), a computer program for executing the above-described processes, (ii) distributing the medium, and (iii) installing the computer program in a computer. Alternatively, the brake controller 11 may be configured by (i) storing the computer program in a storage device that is included in a server device on a communication network and (ii) downloading the computer program onto a normal computer system.

Also, for example, in cases such as in which the functions of the brake controller 11 are achieved by apportionment between an operating system (OS) and an application program, or are achieved by cooperation between the OS and the application program, storage of the application program alone on the recording medium or the storage device is permissible Also, the computer program may be distributed via a communication network by superimposing the computer program on a carrier wave. For example, the computer program may be posted on a bulletin board system (BBS) on a communication network, and the computer program may be distributed via the communication network. Additionally, the computer program may be launched and executed under the control of the OS in the same manner as other application programs so that the above-described processes can be executed.

Embodiments of the present disclosure are not limited to the above-described embodiment. The mechanical brake apparatus 6 includes a freely-selected brake mechanism that mechanically applies a braking force to a wheel. As an example, the mechanical brake apparatus 6 includes a brake pad and generates a braking force by pressing the brake pad against a brake rotor that rotates together with the wheel. As another example, the mechanical brake apparatus 6 includes a brake shoe and generates a braking force by pressing the brake shoe against a drum that is a cylindrical member that rotates together with an axle.

The variable load detector 3 may be mounted on a bogie to detect a load applied to the bogie. In a case in which each bogie includes four wheels, each of the wheels is provided with the mechanical brake apparatus 6, and the variable load detector 3 detects a load W2 applied to the bogie, a necessary braking force F2 is calculated using the following equation (9).

$$F2 = \alpha \cdot W2/4 \qquad (9)$$

The necessary braking forces F1 and F2 need not be equal to each other. For example, the necessary braking force of the mechanical brake apparatus 6 attached to a wheel that is frontward in the traveling direction may be less than the necessary braking force of another mechanical brake apparatus 6 attached to a wheel that is rearward in the traveling direction.

The initial speed acquirer 22 may acquire a rotational speed of the wheel from, instead of the speed sensor 4, an automatic train control (ATC) or from a train information management system (TIMS).

The method of calculating the pressing force is not limited to the above-described example. The target pressing force calculator 23 may (i) store a function for identifying an average friction coefficient from a pressing force for each vehicle speed and (ii) obtain, from the function for each vehicle speed, the relational expression for calculating the average friction coefficient from the pressing force at the initial speed. The relational expression for calculating the average friction coefficient from the pressing force is not limited to a linear function and may be a higher degree function such as a quadratic function or a cubic function. In this case, the target pressing force calculator 23 obtains a higher-order equation regarding the pressing force, obtains an approximate solution, an optimal solution, or the like of the higher-order equation, and calculates the target solution as the target pressing force $N_{tgt}$.

The average friction coefficient calculator 24 may store an average friction coefficient table for each of positions of the wheels in the traveling direction. In this case, the average friction coefficient calculator 24 calculates, for each of the positions of the wheels, an average friction coefficient for each pressing force at the initial speed. Also, the operator 25 (i) obtains, for each of the positions of the wheels, a relational expression for calculating, using the average friction coefficient as a variable, the pressing force at the initial speed and (ii) further obtains, for each of the positions of the wheels, an equation regarding the pressing force. The operator 25 obtains a solution of the equation for each of the positions of the wheels and calculates the target pressing force $N_{tgt}$ for each of the positions of the wheels.

When the operator 25 performs linear interpolation between two adjacent points among the average friction coefficients $\mu_{int\ 1}$, $\mu_{int\ 2}$, and $\mu_{int\ m}$ for each pressing force at the initial speed $V_{int}$ to obtain a relational expression, the pressing force may be estimated from the target deceleration, the initial speed, and the like, and linearly interpolation between two adjacent points closest to the estimated pressing force may be performed, thereby obtaining the relational expression.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Vehicle brake system
2 Brake setter
3 Variable load detector
4 Speed sensor
5 Fluid source
6 Mechanical brake apparatus
10 Brake control device
11 Brake controller
12 Outputter
13 Electro-pneumatic conversion valve
14 Relay valve
15 Pressure sensor
21 Necessary braking force calculator
22 Initial speed acquirer
23 Target pressing force calculator
24 Average friction coefficient calculator
25 Operator
25 Target pressure calculator
31 Processor
32 Memory
33 Interface

The invention claimed is:

1. A vehicle brake control device to control a mechanical brake apparatus that comprises a brake cylinder and a friction member operating in accordance with a pressure of a fluid inside the brake cylinder and generates a braking force by pressing the friction member against a rotatable body that rotates when a vehicle travels, the vehicle brake control device comprising:

necessary braking force calculation processing circuitry to acquire a brake command indicating a target deceleration of the vehicle and calculate, based on the target deceleration indicated by the brake command, a necessary braking force that is the braking force necessary for obtaining the target deceleration;

initial speed acquisition processing circuitry to acquire a speed of the vehicle in response to the acquisition of the brake command by the necessary braking force calculation processing circuitry;

target pressing force calculation processing circuitry to calculate, using an average friction coefficient as a friction coefficient of a contact surface between the friction member and the rotatable body and from the average friction coefficient and the necessary braking force, a target pressing force that is a force for pressing the friction member against the rotatable body in order to obtain the necessary braking force, the average friction coefficient varying depending on (i) an initial speed that is the speed of the vehicle acquired by the initial speed acquisition processing circuitry and (ii) a pressing force that is a force for pressing the friction member against the rotatable body;

target pressure calculation processing circuitry to calculate a target pressure indicating a pressure of the fluid inside the brake cylinder that is necessary for obtaining the target pressing force; and output processing circuitry to compress, in accordance with the target pressure, fluid supplied from a fluid source to supply the compressed fluid to the mechanical brake apparatus, wherein the target pressing force calculation processing circuitry comprises:

an average friction coefficient calculation processing circuitry to calculate, from the average friction coefficient predetermined for each pressing force at each of predetermined speeds of the vehicle that are different from one another, the average friction coefficient for each pressing force at the initial speed; and operation processing circuitry to calculate the target pressing force by (i) obtaining, from the average friction coefficient for each pressing force at the initial speed, a relational expression for calculating, using the average friction coefficient as a variable, the pressing force at the initial speed, (ii) obtaining, by regarding the necessary braking force as corresponding to a product of the average friction coefficient and the pressing force, an equation regarding the pressing force from the relational expression, and (iii) obtaining a solution of the equation.

2. The vehicle brake control device according to claim 1, wherein the average friction coefficient calculation processing circuitry stores an average friction coefficient table for identifying one average friction coefficient from the speed of the vehicle and the pressing force, and calculates, from a value of the average friction coefficient table, the average friction coefficient for each pressing force at the initial speed.

3. The vehicle brake control device according to claim 1, wherein the operation processing circuitry calculates the target pressing force by (i) obtaining, from the average friction coefficient for each pressing force at the initial speed, the relational expression that is a linear function, (ii) obtaining, by regarding the necessary braking force as corresponding to the product of the average friction coefficient and the pressing force, a quadratic equation regarding the pressing force from the relational expression, and (iii) obtaining a solution of the quadratic equation.

4. The vehicle brake control device according to claim 2, wherein the operation processing circuitry calculates the target pressing force by (i) obtaining, from the average friction coefficient for each pressing force at the initial speed, the relational expression that is a linear function, (ii) obtaining, by regarding the necessary braking force as corresponding to the product of the average friction coefficient and the pressing force, a quadratic equation regarding the pressing force from the relational expression, and (iii) obtaining a solution of the quadratic equation.

5. A vehicle brake control method performed by a vehicle brake control device, the vehicle brake control method comprising:

calculating, based on a target deceleration indicated by a brake command, a necessary braking force that is a braking force that a mechanical brake apparatus needs to generate in order to obtain the target deceleration indicated by the brake command, the mechanical brake apparatus (i) comprising a brake cylinder and a friction member operating in accordance with a pressure of a fluid inside the brake cylinder and (ii) generating the braking force by pressing the friction member against a rotatable body that rotates when a vehicle travels;

calculating, using an average friction coefficient as a friction coefficient of a contact surface between the friction member and the rotatable body and from the average friction coefficient and the necessary braking force, a target pressing force that is a force for pressing the friction member against the rotatable body in order to obtain the necessary braking force, the average friction coefficient varying depending on (i) an initial speed that is the speed of the vehicle acquired in response to a start of the brake command and (ii) a pressing force that is a force of pressing the friction member against the rotatable body;

calculating, from the average friction coefficient predetermined for each pressing force at each of predetermined speeds of the vehicle that are different from one another, the average friction coefficient for each pressing force at the initial speed;

calculating the target pressing force by (i) obtaining, from the average friction coefficient for each pressing force at the initial speed, a relational expression for calculating, using the average friction coefficient as a variable, the pressing force at the initial speed, (ii) obtaining, by regarding the necessary braking force as corresponding to a product of the average friction coefficient and the pressing force, an equation regarding the pressing force from the relational expression, and (iii) obtaining a solution of the equation; and compressing the fluid supplied from a fluid source to supply the compressed fluid to the mechanical brake apparatus in accordance with a pressure of the fluid inside the brake cylinder, the pressure of the fluid inside the brake cylinder being a pressure necessary for obtaining the target pressing force.

6. A vehicle brake control device to control a mechanical brake apparatus that comprises a brake cylinder and a friction member operating in accordance with a pressure of a fluid inside the brake cylinder and generates a braking force by pressing the friction member against a rotatable body that rotates when a vehicle travels, the vehicle brake control device comprising:

a necessary braking force calculator to acquire a brake command indicating a target deceleration of the vehicle and calculate, based on the target deceleration indicated by the brake command, a necessary braking force that is the braking force necessary for obtaining the target deceleration;

an initial speed acquirer to acquire a speed of the vehicle in response to the acquisition of the brake command by the necessary braking force calculator;

a target pressing force calculator to calculate, using an average friction coefficient as a friction coefficient of a contact surface between the friction member and the rotatable body and from the average friction coefficient and the necessary braking force, a target pressing force that is a force for pressing the friction member against the rotatable body in order to obtain the necessary braking force, the average friction coefficient varying depending on (i) an initial speed that is the speed of the vehicle acquired by the initial speed acquirer and (ii) a pressing force that is a force for pressing the friction member against the rotatable body;

a target pressure calculator to calculate a target pressure indicating a pressure of the fluid inside the brake cylinder that is necessary for obtaining the target pressing force; and an outputter to compress, in accordance with the target pressure, fluid supplied from a fluid source to supply the compressed fluid to the mechanical brake apparatus, wherein the target pressing force calculator comprises:

an average friction coefficient calculator to calculate, from the average friction coefficient predetermined for each pressing force at each of predetermined speeds of the vehicle that are different from one another, the average friction coefficient for each pressing force at the initial speed; and an operator to calculate the target pressing force by (i) obtaining, from the average friction coefficient for each pressing force at the initial speed, a relational expression for calculating, using the average friction coefficient as a variable, the pressing force at the initial speed, (ii) obtaining, by regarding the necessary braking force as corresponding to a product of the average friction coefficient and the pressing force, an equation regarding the pressing force from the relational expression, and (iii) obtaining a solution of the equation.

7. The vehicle brake control device according to claim 6, wherein the average friction coefficient calculator
stores an average friction coefficient table for identifying one average friction coefficient from the speed of the vehicle and the pressing force, and
calculates, from a value of the average friction coefficient table, the average friction coefficient for each pressing force at the initial speed.

8. The vehicle brake control device according to claim 6, wherein the operator calculates the target pressing force by (i) obtaining, from the average friction coefficient for each pressing force at the initial speed, the relational expression that is a linear function, (ii) obtaining, by regarding the necessary braking force as corresponding to the product of the average friction coefficient and the pressing force, a quadratic equation regarding the pressing force from the relational expression, and (iii) obtaining a solution of the quadratic equation.

9. The vehicle brake control device according to claim 7, wherein the operator calculates the target pressing force by (i) obtaining, from the average friction coefficient for each pressing force at the initial speed, the relational expression that is a linear function, (ii) obtaining, by regarding the necessary braking force as corresponding to the product of the average friction coefficient and the pressing force, a quadratic equation regarding the pressing force from the relational expression, and (iii) obtaining a solution of the quadratic equation.

* * * * *